United States Patent [19]

Gibson et al.

[11] Patent Number: 4,462,066
[45] Date of Patent: Jul. 24, 1984

[54] ELECTRICAL LIGHT CIRCUIT FOR DOLL HOUSE AND OTHER MINIATURE DISPLAYS

[76] Inventors: Holly S. Gibson; Daniel J. Gibson, both of 416 Highland Ave., Westfield, N.J. 07090

[21] Appl. No.: 253,103

[22] Filed: Apr. 13, 1981

[51] Int. Cl.³ .................. F21V 23/04; A63H 33/00; H01H 3/00; H02J 3/00
[52] U.S. Cl. .................................. 362/251; 446/477; 174/DIG. 8; 200/153 T; 307/42; 362/123; 362/145; 362/147; 362/295; 362/392; 362/457; 362/806; 362/810
[58] Field of Search ............... 307/115, 42, 113, 149; 200/153 T, 335; 362/806, 810, 392, 252, 249, 295, 237, 238, 123, 145, 147, 806; 174/DIG. 8; 264/230; 361/356; 46/1 R, 12, 45; 73/201; D10/100; D21/111, 114; 315/321, 314

[56] References Cited

U.S. PATENT DOCUMENTS

| D. 219,792 | 1/1971 | Grosso | D10/100 |
|---|---|---|---|
| 1,889,468 | 11/1932 | Flannery | D21/114 X |
| 2,985,874 | 5/1961 | Williams | 174/DIG. 8 |
| 3,008,024 | 11/1961 | Roeser | 200/153 T |
| 3,083,307 | 3/1963 | Williams et al. | 307/149 |
| 3,351,729 | 11/1967 | Bergman | 200/153 T |
| 3,755,642 | 8/1973 | Warner | 200/153 T X |
| 3,906,295 | 9/1975 | Tessmer | 361/356 |
| 4,203,053 | 5/1980 | Shepard | |
| 4,228,486 | 10/1980 | Matsuya | 362/252 X |

OTHER PUBLICATIONS

Installation Instructions, Elect-a-Lite Inc., ©1979 col. 6, Showing the use of Heat Shrinkable Tube to Splice Miniature Wires.

Primary Examiner—Donald G. Kelly
Assistant Examiner—John S. Maples
Attorney, Agent, or Firm—Martha G. Pugh

[57] ABSTRACT

An electrical lighting circuit for doll houses or other miniature installations includes, for actual connection in operating relation to a power source, a miniaturized master breaker switch, and a miniaturized master panel, together with a distribution circuit. In addition, for aesthetic appeal, a miniature power line input, including a weather head and a miniature current meter box, is simulated. Each of the separate outputs in the distribution circuit from the master panel leads to an individual doll house room or circuit group. One unique circuit group comprises a series circuit of subminiature bulbs mounted in shrink tubes to simulate candles, which are constructed to serve as miniature christmas tree lights, miniature chandeliers, or in like installations.

5 Claims, 13 Drawing Figures

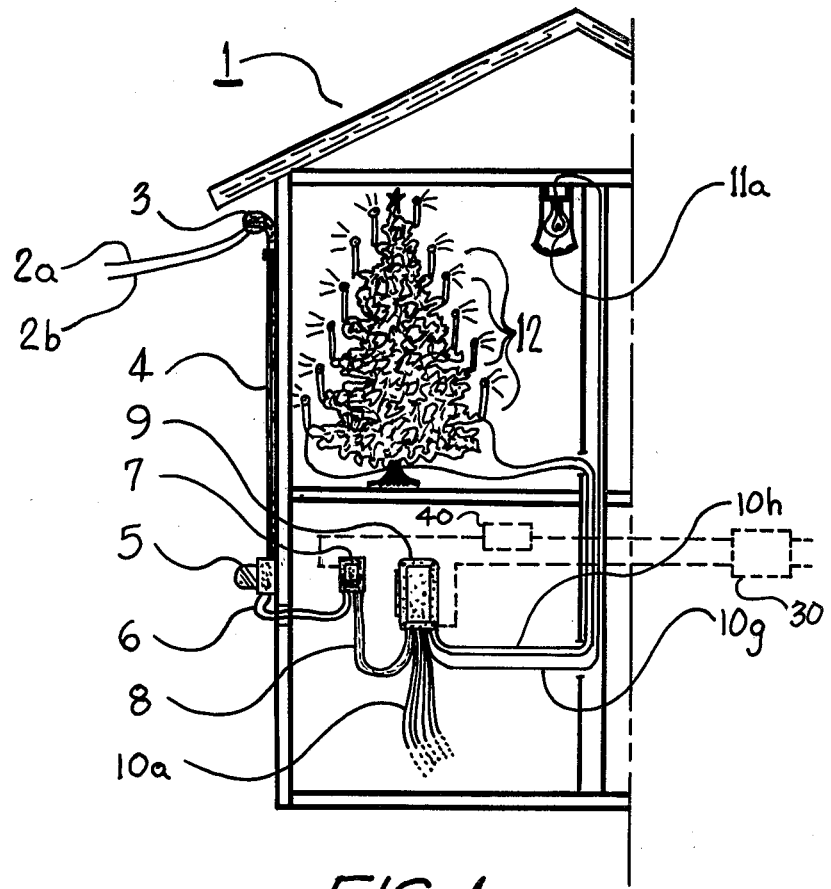
FIG. 1
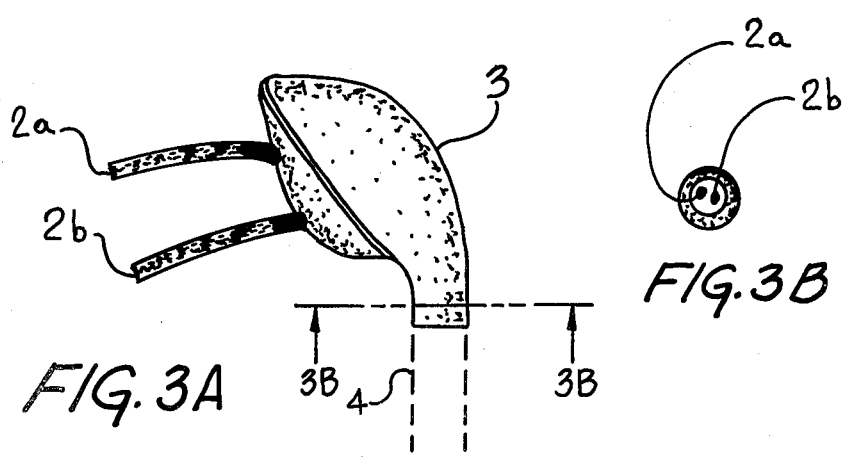
FIG. 3A
FIG. 3B

ELECTRICAL LIGHT CIRCUIT FOR DOLL HOUSE AND OTHER MINIATURE DISPLAYS

BACKGROUND OF THE INVENTION

This invention relates to electrical power and lighting circuits especially designed for doll houses and other miniature displays.

Because of the small scale of the models involved, it is very difficult to provide miniature electrical circuit elements for miniature applications which are, for the most part, actually functional circuit components, and which nevertheless have an appearance which simulates that of their larger circuit counterparts. Although it is necessary to have complete control over the entire circuit, or individual parts of the circuit, the presence of conventional master switches, and conventional on-off switches for separate parts of the display, such as individual doll house rooms, would be unsightly and would completely destroy the illusion created by the miniature display.

Another problem which arises in the manufacture of miniature circuits is that because of the small cross-sectional dimensions of the wires involved, they are likely to rupture, producing at the very least, circuit disfunction, and at the worst, a fire hazard to the entire installation.

BRIEF DESCRIPTION OF THE INVENTION

It is therefore the general object of the invention to provide improved electric lighting and power systems for use in doll houses and other miniature displays.

Another object of the invention is to provide an electrical lighting and power circuit including improved control means and other appliances for miniature displays, which simulate the appearances of their larger counterparts, and most of which miniature control devices are fully functional.

A further object of the invention is to improve the safety and general operability of electrical lighting and power systems used for miniature displays.

Another object of the invention is to improve the aesthetic appeal and authenticity of electrical circuit systems for doll houses and other miniature displays.

These and other objects are achieved in accordance with the present invention in an operative electrical circuit system and accessories for miniaturized installations, in addition to one or more simulated elements to improve the aesthetic appeal. In the embodiment described, the arrangement comprises a simulated power input circuit including a miniaturized weather head and a simulated miniaturized current meter box. A conventional source of power is connected in operating circuit relation to a miniaturized master breaker switch in series with the power source, and a miniaturized master panel including individual switches to a distribution system for a plurality of individual circuits connected in parallel across the source of power, and individual circuit acessories including a cluster of subminiature simulated electrical candles connected in series for use on miniature christmas trees, chandeliers, candelabras or the like.

In the present embodiment, the source of power takes the form of a conventional 110 volt AC step-down transformer, which steps down the voltage across the secondary coil to about 12 volts. In the present illustration, the miniaturized master breaker switch is disposed in a steel-gray formed plastic breaker switch housing which measures 13/16 inch long, ½ inch wide, and 5/16 inch thick. This is superposed on a subminiature single-pole-double-throw leaf spring lever microswitch, rated for 5 amperes, 250 volts AC, which is connected in series with the transformer secondary. In accordance with the present invention, the leaf spring lever of the microswitch is actuated by a simulated breaker bar comprising a wire formed in the shape of a hollow rectangle, which is mounted with one edge serving as an axis for partial rotation in a slot across the center of the miniature breaker switch housing. A pin projecting inwardly from the axially-disposed edge of the breaker bar operates upon partial rotation of the bar to actuate the microswitch lever to depress the microswitch pushbutton, to operate the microswitch.

Another element in the circuit system of the present invention is the miniature master panel, which comprises a rectangular steel-gray box of formed plastic, or the like, which measures 9/8 inch by ⅝ inch by ⅝ inch in depth. In the present embodiment, this contains eight on-off toggle switches arranged in parallel relation, providing a miniaturized working circuit element constructed to simulate the full-sized master panel in a residence or other building. The eight toggle switches of the master panel are each connected through a common pole to one end of the transformer secondary, the other poles being connected to close each of the eight circuits of the distribution system which are arranged in parallel relation to the other terminal of the transformer secondary through the master switch, across about 12 volts AC. Each of the 12 volt circuits leads to a different room or area of the doll house or other miniature display. It will be understood that the miniature master panel may contain different numbers of switches arranged to service different areas, depending on the requirement for a particular installation.

A particular feature of the present invention is that one or more of the eight disclosed 12 volt parallel circuits, instead of leading to a conventional miniature lighting circuit including one or more miniature lights or lamps for a particular area of the doll house or other miniaturized display, may be connected through a series circuit of, say, eight subminiature lights. Eash subminiature light comprises a tiny 15 milliampere bulb, roughly, ⅛ inch in cross-section and ⅜ inch long, mounted at one end of a heat-shrinkable tube about ¼ inch long and 0.063 inch in inner diameter, so that the lead wires pass axially through the tube, and emerge from the other end. The potential drop across each subminiature light should not exceed about 1.5 volts. The tube is initially heated, causing it to shrink-fit around the wires, holding them in place. Each of the subminiature bulbs assembled with its individual shrink-fitted tube simulates a tiny electric candle, which may be used for christmas tree lighting, or many other decorative purposes in the doll house or other miniature installations, such as for chandeliers, candelabras, wall lights, window candle lights, etc.

Other objects, features, and advantages of the miniature lighting system of the present invention will be apparent to those skilled in the art from a detailed study of the application with reference to the attached drawings.

SHORT DESCRIPTION OF THE DRAWINGS

FIG. 1 is a fragmentary showing of a doll house, showing the physical location and arrangement of the miniaturized circuit elements and accessories of the present invention.

FIG. 3A is an enlarged, perspective view of a typical miniaturized weather head forming part of a simulated circuit connection of the electrical power lines into the doll house in accordance with the present invention.

FIG. 3B is a sectional showing of the simulated miniaturized weather head 3A along the plane 3B of FIG. 3A.

DETAILED DESCRIPTION OF THE DRAWINGS

Figure 2:
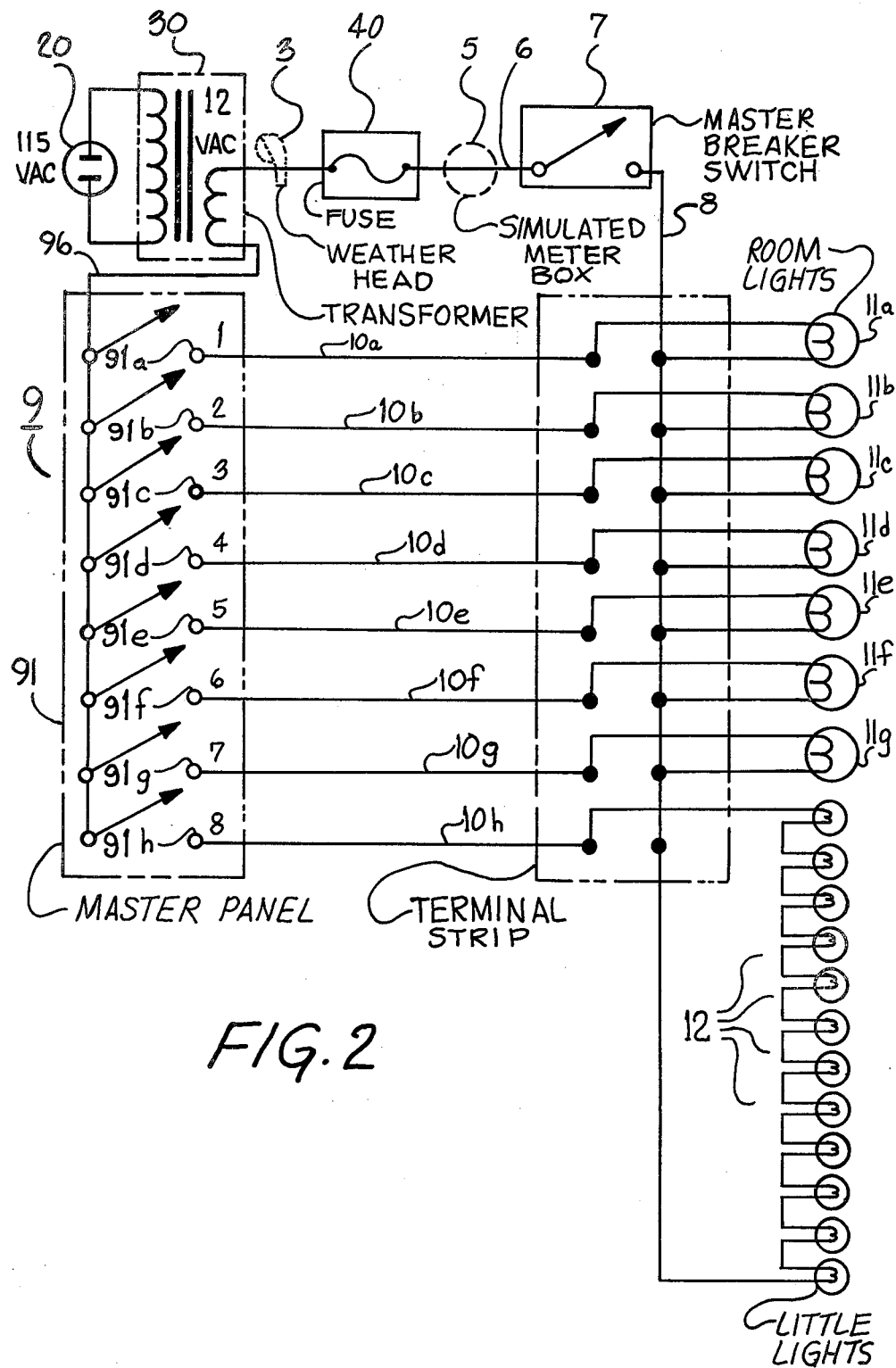
FIG. 2 is a schematic of the circuit of the present invention.

Referring to FIG. 1 of the drawings, there is shown a view, looking into one section of a typical doll house 1, having a miniaturized electrical circuit installation in accordance with the present invention. In the present embodiment, the doll house may be, for example, 30 inches long, by 14 inches wide, by 25 inches high. Typically, the elements in applicant's miniaturized electrical circuit installation are scaled one-inch-to-the-foot, with every effort being made to provide an authentic miniaturized representation of their full-sized counterparts.

To increase the aesthetic appeal, simulated power lines 2a, 2b appear to pass into the house 1 through the simulated weather head 3, which is fastened to the outer wall just under the roof at the upper end of vertically disposed cable 4, which comprises a steel-gray tube of plastic material such as polyvinyl chloride, or alternatively, of metal, having an outer diameter of 0.125 inch, and a wall thickness of 0.020 inch. The lower end of cable 4 appears to pass through a simulated electric current meter box 5, which, although not an operating part of the circuit, appears to be so. This is fastened to the outer wall of the doll house 1 about five inches above what appears to be ground level. From the meter box 5, the simulated cable 6, which is a continuation of simulated cable 4, passes in through the wall of the doll house to a basement or utility area and appears to be connected through the miniaturized master breaker switch 7 installed on one wall of the area, through cable 8 to a miniaturized master panel 9.

The latter, in the present embodiment, has mounted therein, in parallel relation, eight miniature toggle switches, each of which controls the operation of a different one of parallel circuits 10a through 10h, each leading to a different room or different area in the doll house. A typical one of these circuits, for example, 10g, encased in suitable cable insulation, passes through the floor of the doll house and passes inside or adjacent one of the lateral room walls to the ceiling, leading into a conventional miniature room light 11a.

A particular feature of the present invention is that at least one of the circuits 10h under control of master panel 9 passes up through the floor of the doll house, and into a suitable position along one of the lateral walls to power a series circuit containing, for example, eight or more miniaturized candles 12, which, in the present embodiment, are shown as christmas tree lights. Each of the foregoing components will be described in greater detail hereinafter.

In a preferred embodiment, however, as shown in the circuit schematic of FIG. 2 and in phantom in FIG. 1, the actual source of power does not enter through the weather head 3 and the simulated cable 4, but may be derived from any conventional 110 volt, 60 hertz, AC source 20, which may be a residential wall plug outlet, to which is connected a conventional step-down transformer 30, which reduces the potential to about 12 volts AC. The transformer 30 may be enclosed in a small housing which plugs directly into the outlet 20. A circuit connected in series with the secondary coil of transformer 30 includes a conventional fuse 40 in series with the master breaker switch 7, to be described in detail with reference to FIGS. 5A, 5B and 5C of the drawings. Master breaker switch 7 is equipped with a single master breaker bar which is moved to and fro to simultaneously turn on or off all the circuits in the doll house 1.

One end of the secondary coil of transformer 30, in series with the fuse 40 and switch 7, is connected to one terminal of the master panel 9, through a lead wire interposed through cable 8. The other terminal of master panel 9 is returned to the other end of the secondary of transformer 30, as shown in phantom. Various devices are contemplated in accordance with the present invention for providing actual power to the doll house circuits, the lines for which could conceivably enter through the weather head.

In the present embodiment, master panel 9, to be described in detail hereinafter with reference to FIGS. 6A, 6B, controls eight circuits connected in parallel, each through identical toggle switches, 91a-91h. Each of the parallel circuits from the master panel 9, as previously stated, leads to a separate area or separate rooms of the doll house. For example, one of these circuits may comprise the room light 11a as indicated in FIG. 1. Others of these circuits may power similar room lights, or lamps, 11b-11g, in other parts of the doll house.

In addition, as previously stated, one or more of the circuits under control of the switches of master panel 9 controls a series circuit including eight or more subminiature candles 12, which may be utilized as christmas tree lights, or alternatively, as chandeliers or candelabras in different areas of the doll house. These miniature candles will be described in detail with reference to FIGS. 7A and 7B of the drawings.

FIGS. 3A and 3B show in detail the typical miniaturized weather head 3 which may be used, for the purposes of the present invention, to support the simulated electrical power lines 2a and 2b leading into cable 4.

The weather head 3 may, for example, be formed of molded plastic, being steel-gray in color, its upper lateral face having a diameter of 0.280 inch, being directed toward the power lines, and tapering to an inner diameter of 0.125 inch at its inner coupling end, which is directed vertically downward, being coupled into cable 4. FIG. 3B shows a cross-section through the plane 3B—3B of FIG. 3A. Cable 4, comprises a tube of, for example, polyvinyl chloride, or some other similar insulating plastic, or alternatively metal, which is 0.125 inch in outer diameter and 0.085 inch in inner diameter. It is steel-gray to simulate a typical electrical cable leading into a typical house circuit.

Figure 4A:
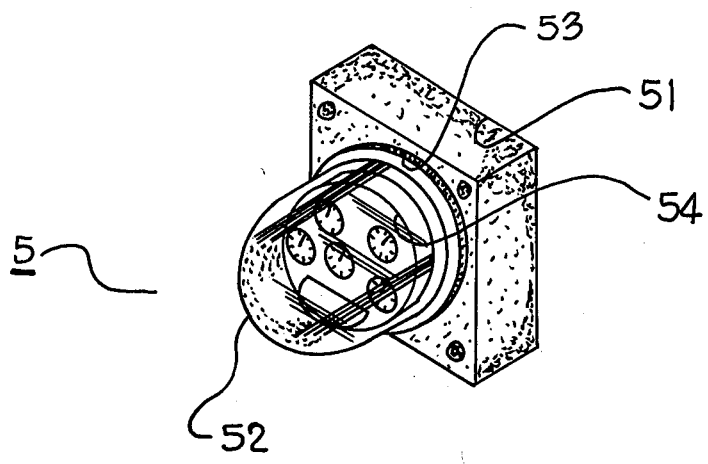
FIG. 4A is a perspective, enlarged showing of a simulated electric current meter box in accordance with the present invention.
Figure 4B:
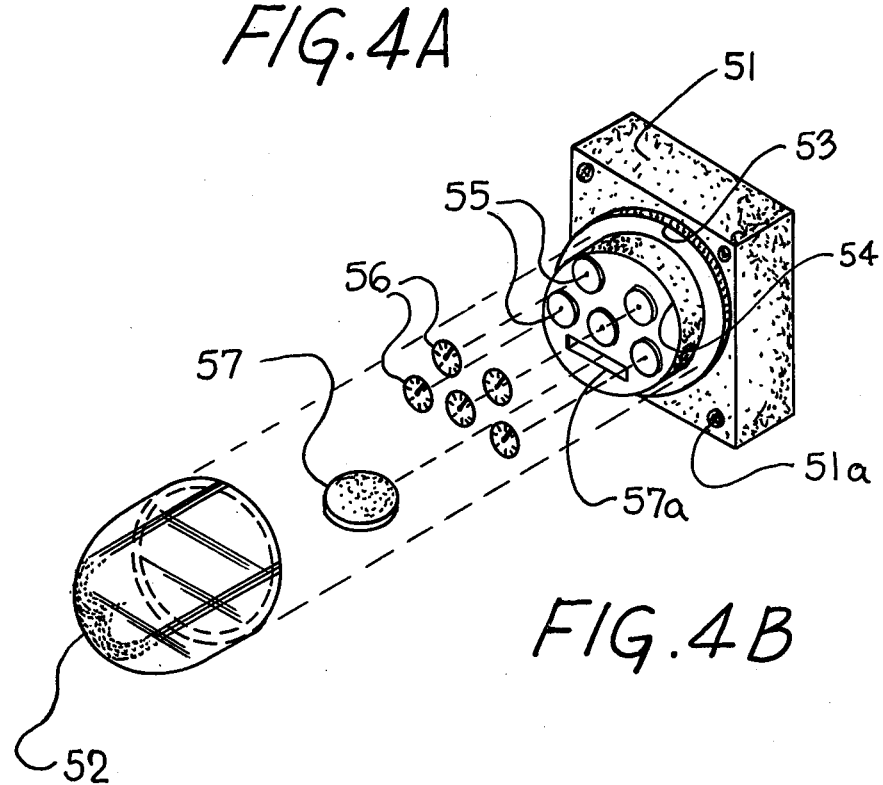
FIG. 4B is an enlarged, exploded view of the simulated electric current meter box of FIG. 3A.

Positioned near the lower end of cable 4 and supported against the outer wall of the doll house 1, is a simulated electric current meter box 5 which is shown in detail in FIGS. 4A, 4B of the drawings. The meter box 5, which is made to faithfully represent the type of current meter box attached to the outer wall of the typical residence, comprises a rectangular base 51 which is 0.562 inch square by 0.14 inch thick, and has 4 miniature screws 51a disposed at the corners. Centered on the upper face of base 51 is a circular pedestal 53 which is 0.54 inch in outer diameter and 0.03 inch thick. Mounted concentrically with, and resting on the pedestal 53, is a miniature glass dome 52, of the bell-jar type, having an inner diameter of 0.435 inch at its lower open end. The miniature glass dome 52 just fits over the perimeter of cylindrical support 54 which is 0.44 in diameter, coaxial with the circular pedestal 52, and extending 0.111 inch above its upper face. Although the diameter of the dome 52 may be formed slightly smaller than the support 54, due to the elasticity of the plastic, it can be force-fit on the support.

On the upper surface of the cylindrical support 54 are positioned a plurality, (say, five in the present illustration) simulated meters 55 to which are attached typical dials 56. A brass disk 57 which is about 0.2 inch in diameter, fits into a slot 57a at one side of the top surface of 54, the meter elements being assembled as shown in FIG. 4A. The device is crafted to faithfully represent a typical electric current meter box of a type which is employed to measure residential current.

Figure 5A:
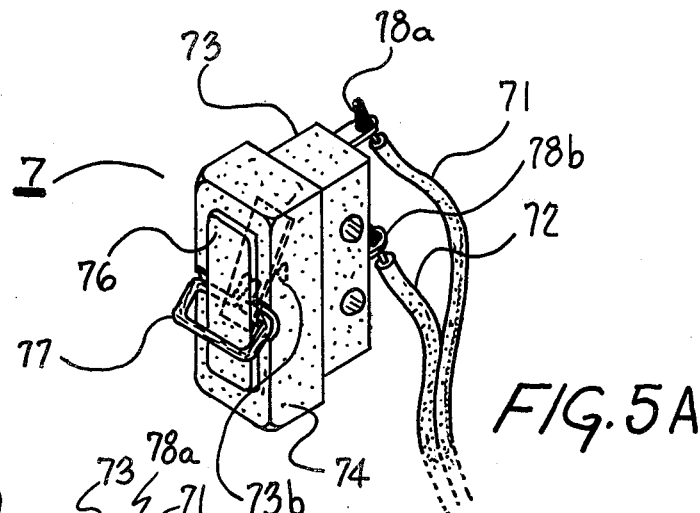
FIG. 5A is an enlarged, perspective view of the miniaturized master breaker switch of the present invention.
Figure 5C:
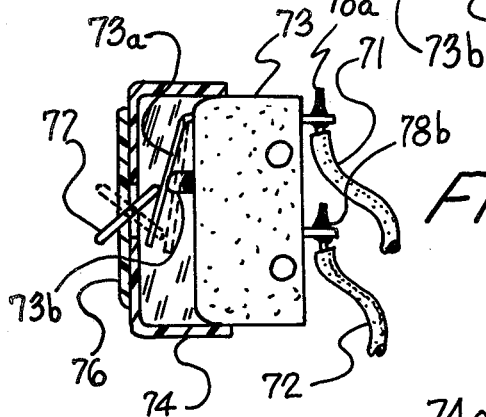
FIG. 5C is a longitudinal section through the master breaker switch housing of FIG. 5A showing the operation of the simulated breaker bar.
Figure 5B:
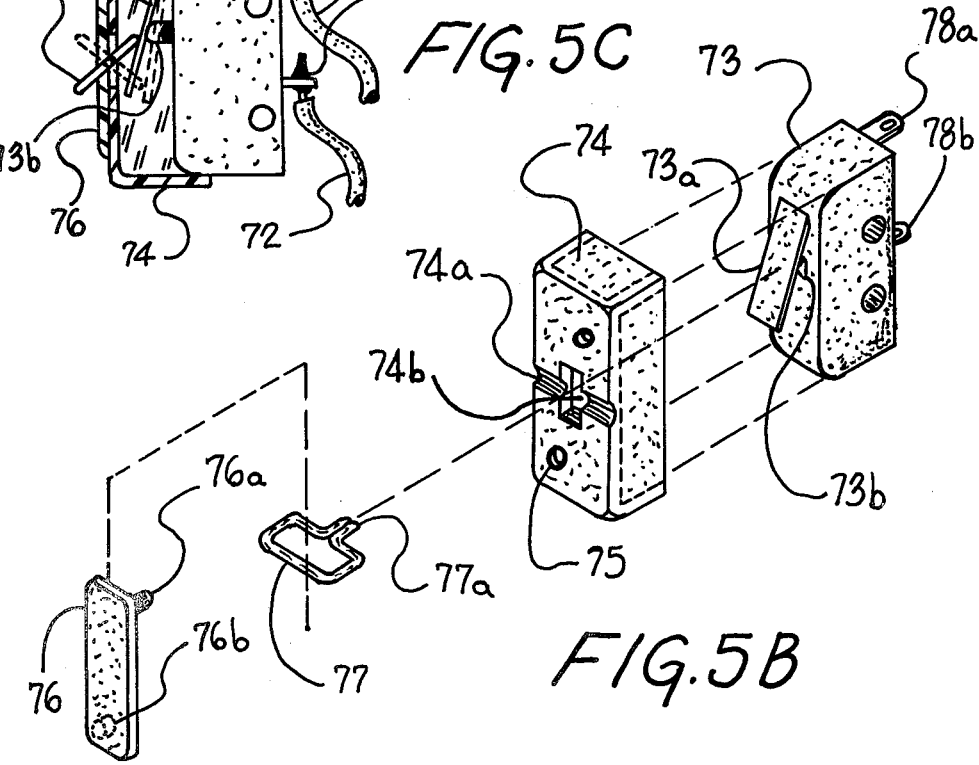
FIG. 5B is an enlarged, exploded view of the miniaturized master breaker switch of FIG. 5A.

Referring to FIG. 5A of the drawings there is shown in detail a miniaturized master breaker switch 7 in accordance with the present invention. This is formed to cooperate with a typical microswitch of the type shown and described, for example, in Radio Shack Catalog as: subminiature lever switch number 275-016, operating force, 45 grams, contacts rated 5 amperes at 250 VAC, lever length ¾ inch and solder lugs. This may take the form of a subminiature single-pole-double-throw switch.

In the present embodiment, the housing of breaker switch 7 is rectangular in form, ⅞ by ⅜ inch in length and width, by ⅜ inch in overall depth. This is superposed on the housing 73 of the conventional microswitch, which is ¼ inch wide by 11/16 inch long by ¼ inch deep. A series of lead-in wires 71 and 72, representing cable 6 and cable 8 of FIG. 1, are soldered at their terminals to the terminals 78a and 78b of the microswitch 73. Microswitch 73 is actuated from its normally "off" to its "on" position by means of a push-button 73b on its outer face which is depressed by the leaf spring lever 73a. The latter is soldered or otherwise secured at one end to the surface of the microswitch housing. The lever 73a is 0.450 inch long and 0.155 inch wide; and in normally unoperated position is disposed at an angle of about 20 degrees with the outer face of the microswitch housing 73.

The simulated breaker bar housing 74 is formed to include in its upper surface a semicylindrical channel 74a about 0.055 inch deep, centered across the width, and leading from each edge into a central rectangular opening 74b, 0.12 inch wide by ¼ inch long. The simulated breaker bar is formed, for example, from 20 gauge stainless steel wire into a hollow rectangle 7/16 inch long by ⅛ inch wide, the inner ends of which are joined together to protrude 3/32 inch from the center of one of the long sides to form a projection 77a which is interposed through the opening 77b, when the inner side of rectangle 77 is accommodated in slot 74a in rotatable relation. Thus, the hollow wire rectangle 77 (simulated breaker bar) when positioned in the slot 74, is disposed to rock back and forth so that the projection 77a in one position bears on and depresses the lever 73a, which, in turn, depresses the microswitch button 73b (See FIG. 5C). This actuation of simulated breaker bar 77 controls the operation of microswitch 73. A rectangular facing panel 75, which is ⅝ inch long by 5/16 inch wide by 1/32 inch thick has a pair of studs 76a and 76b protruding from its under side which fit into the openings 75b and 75a on the surface of 74, thereby providing a closure which covers the face of 74 including the inner side of the simulated breaker bar 77.

Figure 6A:
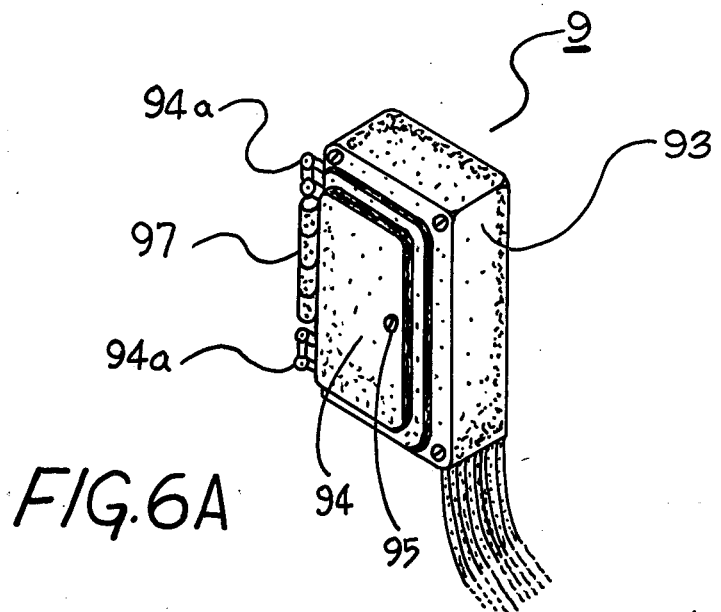
FIG. 6A is an enlarged, perspective view of the miniaturized master panel of the present invention, with the door closed.
Figure 6B:
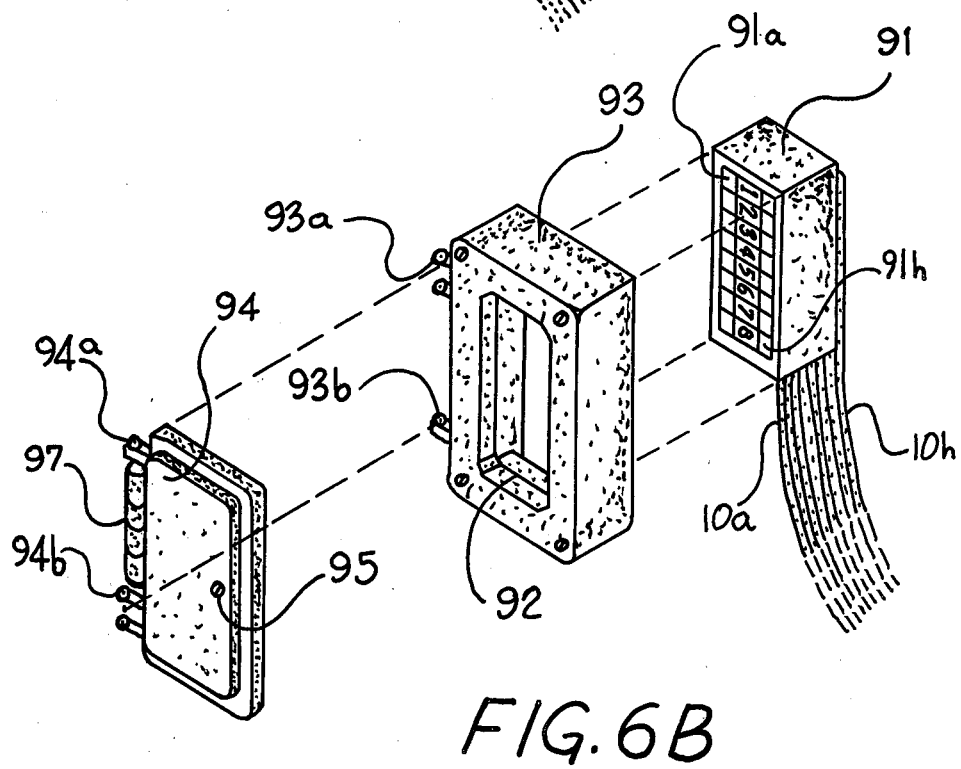
FIG. 6B is an enlarged, exploded view of the miniaturized master panel of FIG. 6A.

Referring to FIGS. 6A and 6B, details are shown of the master panel 9. This comprises an overall rectangular housing yoke 93 which is 1.187 inches long by 0.678 inch wide by 0.312 inch deep, having a central rectangular opening 92, which is 0.89 inch long by 0.395 inch wide which accommodates an inner rectangular switch box 91, including a plurality of miniature toggle switches 91a through 91h (eight in the present embodiment) each 0.009 inch wide and 0.390 inch long on their upper surfaces, being aligned in a rectangular parallel array mounted on the outer surface of box 91. One terminal of each of the switches 91a through 91h has soldered to it a respective one of the terminal wires 10a through 10h, the common terminal of the switches 91a through 91h being connected together to a conductor 96, which, in turn, is connected through an insulating cable to one terminal of the secondary coil 12 volt AC transformer 30. (See FIG. 2). A door 94 which is 0.875 inch by 0.375 inch has a pair of hinges 94a and 94b which are spaced-apart to fit onto projecting members 93a and 93b along one side of the yoke housing 93. The door 94 includes a tiny stud 95 which serves as a handle, and a plurality of lateral projections 97 which gave the appearance of simulated hinges.

Figure 7A:
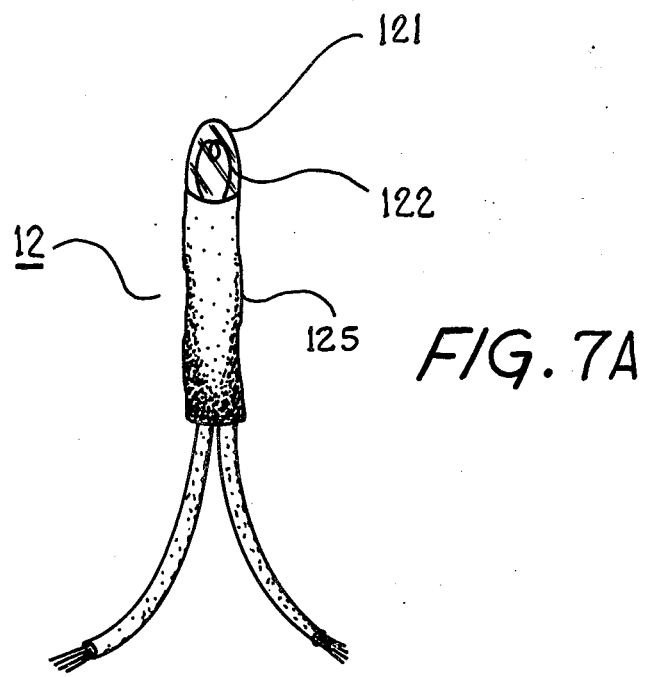
FIG. 7A is an enlarged, perspective view of a subminiature electric candle in accordance with the present invention.
Figure 7B:
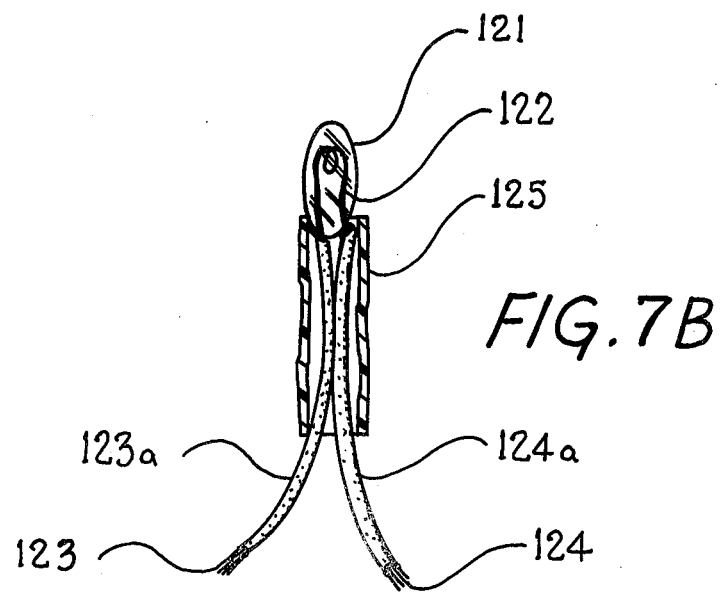
FIG. 7B is an enlarged showing of the subminiature electric candle of FIG. 7A, with the enclosing tube diametrically sectioned to show the interior.

Referring to FIGS. 7A and 7B, there is shown, enlarged to a scale of, roughly, 6-to-1, a simulated miniaturized electric candle 12. This comprises a subminiature bulb 121 having an overall diameter of ⅛ inch and ⅜ inch along the principal axis in which is mounted a tiny tungsten filament 122. Each of these tiny bulbs has a rating of 15 milliamperes, and is designed to operate across a maximum of about 1½ volts AC. The ends of the filament 122 pass out of the end of evacuated bulb 121 and are soldered or otherwise secured to a pair of conductors each comprising 5-strand hair-like lead wires 123 and 124. The 5-strand wires are each encased in an insulating tube 123a and 124a, respectively, of, for example, polyvinyl chloride or the like. The multi-strand lead wires 123, 124, including insulating sleeves 123a and 124a, are each threaded through a hollow cylindrical shrink tube 125 which is 0.05 inch in inner diameter, and has an initial wall thickness of 0.015 inch, and is, say ¼ inch long. Once the insulated wires 123 and 124 are in place, so that the bulb 121 rests with its inner end accommodated in one end of the shrink tube 125, the latter is then heat-treated for a period of, say, 3 to 5 seconds, at a temperature of, say, 121° Centigrade, causing it to shrink up and encapsulate the insulating lead wires, holding the same in place. The shrink ratio of tube 125 is to about 50 percent of the initial diameter when heated as indicated above, producing a final outer diameter of 1/16 inch in the present illustration. The plurality of these tiny simulated candles 12, for example, between eight and twelve, may be connected in series across one of the 12 volt outlets of the master panel 9, to serve as, for example, christmas tree lights as indicated in FIG. 1 of the drawings.

Alternatively, it will be apparent to persons skilled in the art that as previously indicated, these tiny simulated candles have many other uses, such as, for example, for chandeliers, for display on tiny mantles or dining room tables, or as window decorations, etc.

Although, for the purposes of the present illustration, certain of the circuit elements, such as the entering power circuit including the weather head and meter box, have been indicated as simulated, and not part of the working circuit, it will be understood that it is possible to modify the circuit so that these elements, also, may be part of the operating circuit. Conversely it will be understood that in a simplified form of the system of the present invention, circuit elements such as the master breaker switch and the master panel can be interposed as simulated, non-working elements of the system.

It will be understood that the present invention is not limited to the specific forms or combinations indicated by way of example, but only by the scope of the appended claims.

We claim:

1. An electrical system, which is constructed to comprise a distribution system for supplying light and power to a doll house or other miniature structure to simulate a conventional residential electrical distribution system, which comprises in combination:

an AC source of electrical power;
    a step-down transformer having a primary coil connected across said source of power, and a secondary coil external to said doll house or other miniature structure, said secondary coil being connected to impose on the distribution system for said doll house or other miniature structure an energizing voltage not exceeding about 12 volts a miniaturized master breaker switch in combination with a normally open microswitch disposed in said distribution system;
    a miniaturized master breaker switch comprising said master breaker housing having in its outer surface a central opening and a simulated breaker bar comprising a loop having a pair of elongated substantially parallel sides, a projection centered on and protruding from one of said elongated sides, said breaker bar mounted for partial rotation to and fro about one of said elongated sides from "off" to "on" position in said opening in operating relation to said normally-open microswitch;
    said microswitch disposed in a microswitch housing substantially enclosed in said master breaker housing, and operated by a push-button protruding from the outer surface of said microswitch housing within said master breaker housing;
    a spring-biased lever with one end pivoted on the outer surface of said microswitch housing, and the other end disposed, in non-operated position, adjacent said push-button;
    said breaker bar being mounted so that said projection is interposed through said opening to just contact an area adjacent the other end of said spring-biased lever, whereby when said loop is rotated from a first position to a second position, said projection is caused to bear against said spring-biased lever, causing said lever to depress said push-button to operate said microswitch;
    said microswitch connected in energy transfer relation with said transformer secondary coil for turning the power between "off" and "on" positions in said secondary coil;
    said distribution system including a miniaturized master panel including a master panel housing and a plurality of miniature two-way toggle switches mounted in parallel relation to one another on a surface of said master panel housing, one pole of each of said toggle switches being coupled in common circuit relation to one terminal of said secondary coil; and
    the other poles of said toggle switches being respectively connected in parallel circuit relation to individual circuits constructed and arranged to lead to lighting means in different rooms or areas of said doll house or miniature structures;
    wherein the overall dimensions of each of said master breaker switch housing and said miniaturized master panel housing do not exceed about 2 inches.

2. The combination in accordance with claim 1 wherein at least one of said individual circuits includes a series circuit comprising a plurality of miniature simulated electric candles, each comprising a subminiature electric bulb, each having a voltage rating not exceeding about 1½ volts.

3. The combination in accordance with claim 2 wherein the electric bulb of each of said simulated electric candles and the connecting leads thereto are each mounted in a shrink tube which has been heat-treated to conform internally to said bulb and said connecting leads.

4. The combination in accordance with claim 2 wherein each of said miniature simulated electrical candles comprises in combination:

a miniature electric light bulb including a filament, wherein said bulb does not exceed about ⅛ inch in length and ¼ inch in cross-section, said bulb being rated for 15 milliamperes;
    a pair of electrical conductors in insulating sleeves respectively connected to opposite ends of said filament;
    a shrink tube of thermoplastic or thermosetting material, one end of said bulb and a portion of said conductors being encased in said tube, said tube having been heat-treated to shrink fit it in place on said bulb and said conductors, wherein said shrink tube does not exceed about ⅛ inch in inner diameter and ½ inch in length.

5. The combination in accordance with claim 3 wherein the maximum dimension of each of said subminiature bulbs does not exceed about ½ inch; and the maximum length of said shrink tube does not exceed about ½ inch.

* * * * *